(12) United States Patent
Ozasa

(10) Patent No.: US 6,782,033 B2
(45) Date of Patent: Aug. 24, 2004

(54) ROTATABLE LASER WINDOW WITH SPRING-LOADED BEARING

(75) Inventor: Janet G. Ozasa, Fremont, CA (US)

(73) Assignee: Coherent, Inc., Santa Clara, CA (US)

( * ) Notice: Subject to any disclaimer, the term of this patent is extended or adjusted under 35 U.S.C. 154(b) by 248 days.

(21) Appl. No.: 10/051,238

(22) Filed: Jan. 18, 2002

(65) Prior Publication Data

US 2003/0138023 A1 Jul. 24, 2003

(51) Int. Cl.[7] .............................................. H01S 3/00
(52) U.S. Cl. ....................................................... 372/108
(58) Field of Search ................................ 372/103, 107, 372/108

(56) References Cited

U.S. PATENT DOCUMENTS

| | | | |
|---|---|---|---|
| 4,121,175 A | 10/1978 | Hamil et al. ................ 331/94.5 |
| 4,891,818 A | * 1/1990 | Levatter ....................... 372/57 |
| 5,017,769 A | 5/1991 | Cohn et al. .................. 250/216 |
| 5,247,537 A | 9/1993 | Kaiser et al. ................ 372/107 |
| 5,829,760 A | 11/1998 | Mistrater et al. ........... 279/2.22 |

* cited by examiner

*Primary Examiner*—Quyen Leung
(74) *Attorney, Agent, or Firm*—Stallman & Pollock LLP

(57) ABSTRACT

A bearing for a rotatable window in a laser enclosure includes a bearing shaft rotatably fitted in a bearing sleeve. The bearing shaft is in the form of a hollow cylinder and the window is held in the bearing sleeve. The bearing shaft and the bearing sleeve each include a circumferential generally V-shaped groove. The grooves are aligned with other and a coil spring in the form of a continuous loop is located in the grooves. Coils of the coil spring make point contact with sloping surfaces of the grooves and are under radial compression. This provides an axial and radial preload for the bearing. The radial and axial preload retain the bearing shaft in the bearing sleeve while maintaining alignment of the window as the bearing shaft is rotated.

17 Claims, 7 Drawing Sheets

ROTATABLE LASER WINDOW WITH SPRING-LOADED BEARING

TECHNICAL FIELD OF THE INVENTION

The present invention relates generally to a bearing assembly for rotating a shaft in a bearing sleeve. The invention relates in particular to a window for the output beam of a laser resonator in a hermetically sealed enclosure, the window being rotatable in the enclosure for placing different areas of the window in the path of the laser output.

DISCUSSION OF BACKGROUND ART

It is common practice in the commercial laser manufacture to locate components of a laser resonator in a hermetically sealed enclosure for protecting the components from contamination by atmospheric gases and particulate matter. Typically, the output beam of an enclosed laser is delivered via a window that is provided in the enclosure. If the laser provides an output beam of high-energy radiation, such as ultraviolet radiation, the laser window may gradually be degraded by the radiation at an area of the window through which the laser radiation passes. This presents a problem, initially, in that it reduces the output power of the laser available outside the enclosure. Eventually, such degradation could require that the window be replaced to avoid further reduction of output power.

One arrangement for avoiding frequent replacement of a laser output window is to provide a window that has a much greater area, for example about 10 times the area or more, than the area through which the laser beam passes. When degradation of one area of the window becomes unacceptable, the window is moved such that the laser beam can pass through an undegraded area of the window. In order for this to be a practical solution to the output power degradation problem, the window must be easily movable, and preferably movable without breaking the hermetic seal of the enclosure, or contaminating the interior of the enclosure.

SUMMARY OF THE INVENTION

In a general aspect, the present invention is directed to a bearing assembly comprising a cylindrical bearing sleeve and a bearing shaft rotatably located in the bearing sleeve. The bearing sleeve has an inner wall including a circumferential groove extending therearound. The bearing shaft also has a circumferential groove extending therearound. The circumferential grooves are aligned with each other and a coil spring in the form of a continuous loop located within the grooves. The coil spring and the grooves are arranged such that the bearing shaft is rotatably and removably retained in the bearing sleeve.

Preferably the bearing sleeve and bearing shaft grooves are generally V-shaped and include first and second sloping surfaces. The coil spring is arranged to make point contact with the sloping surfaces of the grooves. Preferably, the coil spring is held under longitudinal tension in the bearing shaft groove with coils of the spring radially compressed between the grooves.

Particular aspect the present invention is directed to providing a rotatable window in an enclosure housing a laser. The cylindrical bearing sleeve is located in a wall of the enclosure. The bearing shaft is in the form of an open cylinder. The window is held within the open cylinder of the bearing shaft such that the window has a rotation axis corresponding to the rotation axis of the bearing shaft. The laser is arranged in the enclosure such that the output beam of the laser is transmitted through the window at a region thereon offset from the rotation axis thereof by a predetermined distance. The predetermined distance is selected such that the bearing shaft may be selectively rotated to cause the laser beam to be transmitted through the window at a second region thereon displaced from the first region. This arrangement permits that, should the laser window be damaged by the laser beam in one region, the window can be rotated such that the beam is transmitted through an undamaged region.

One advantage of the present invention is that the compression of the coil spring between the grooves provides a radial and longitudinal preload that combine to maintain the window in alignment as it is rotated. Another advantage of the bearing of the present invention is that the requirement for lubricants to facilitate rotation of the bearing is minimized. This makes it useful for providing a bearing access to an enclosure in which organic contaminants must be minimized.

It is emphasized here that usefulness of the inventive bearing assembly is not limited to the above-described window rotating application. Those skilled in the art may devise other applications for the bearing without departing from the spirit and scope of the present invention.

DETAILED DESCRIPTION OF THE INVENTION

Figure 1:
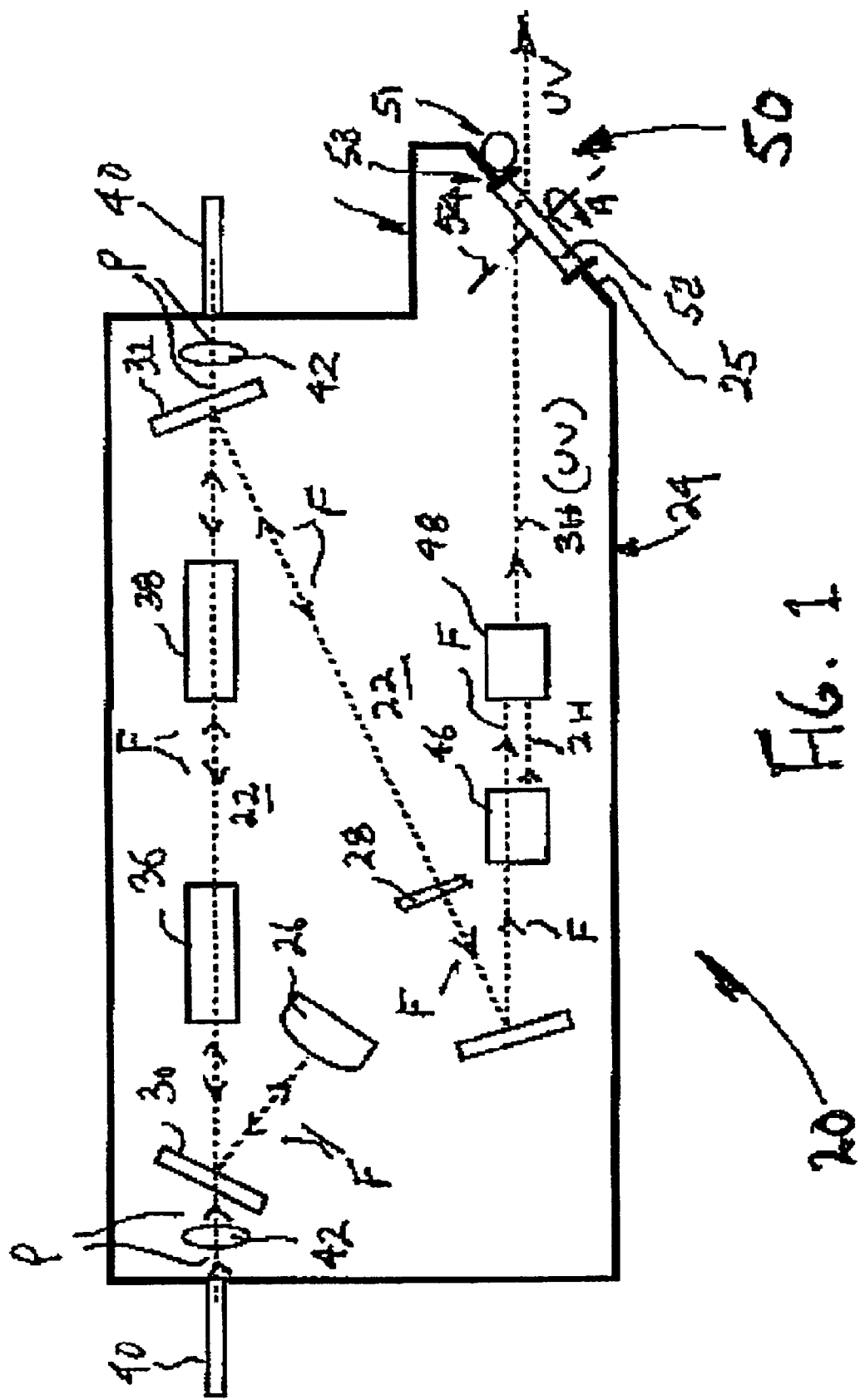
FIG. 1 schematically illustrates a laser resonator located in a hermetically sealed enclosure including a rotatable laser output window assembly in accordance with the present invention.

Before proceeding with a description of details of a rotatable laser window arrangement in accordance with the present invention, a description of a laser apparatus including such a rotatable laser window his first provided. Referring to FIG. 1, an ultraviolet laser 20 includes a laser resonator 22 located in a hermetically sealed enclosure 24. Laser resonator 22 is terminated by mirrors 26 and 28. Mirror 28 is the output mirror of the laser resonator. Laser resonator 22 is folded by mirrors 30 and 32 to reduce the physical length of the resonator. Located in laser resonator 22 between fold mirrors 30 and 32 are two gain-elements 36 and 38. The gain elements are selected to provide laser radiation at a wavelength of about 1064 nanometers (nm). The gain elements may be fabricated from the same or different gain media. Suitable gain media include Nd:YAG, Nd:YVO$_4$, and Nd:YLF.

The gain-elements are energized by pump light P delivered via optical fibers 40 from diode-laser pump light sources (not shown). The pump light from the optical fibers is focused by lenses 42 through fold mirrors 30 and 32 into gain elements 36 and 38 respectively. The fundamental (1064 nm) radiation circulates in laser resonator 22 as indicated by arrows F. A portion of fundamental radiation F exits laser resonator 22 via output mirror 28 and is directed via a turning mirror 44 into a first optically nonlinear crystal 46. A portion of fundamental radiation F passing through optically nonlinear crystal 46 is converted (frequency doubled) to provide second-harmonic radiation 2H. Unconverted fundamental radiation F and second harmonic radiation 2H enter a second optically nonlinear crystal 48. The unconverted fundamental radiation and the second-harmonic radiation are mixed in optically nonlinear crystal 48 to form third-harmonic (frequency tripled) radiation 3H. This third-harmonic radiation has a wavelength of about 355 nm in the ultraviolet (UV) region of the electromagnetic spectrum. This UV laser radiation exits enclosure 24 via a rotatable window arrangement 50 in accordance with the present invention. The rotatable window arrangement is located on a wall 25 of an extension 24E of enclosure 24.

Figure 2:
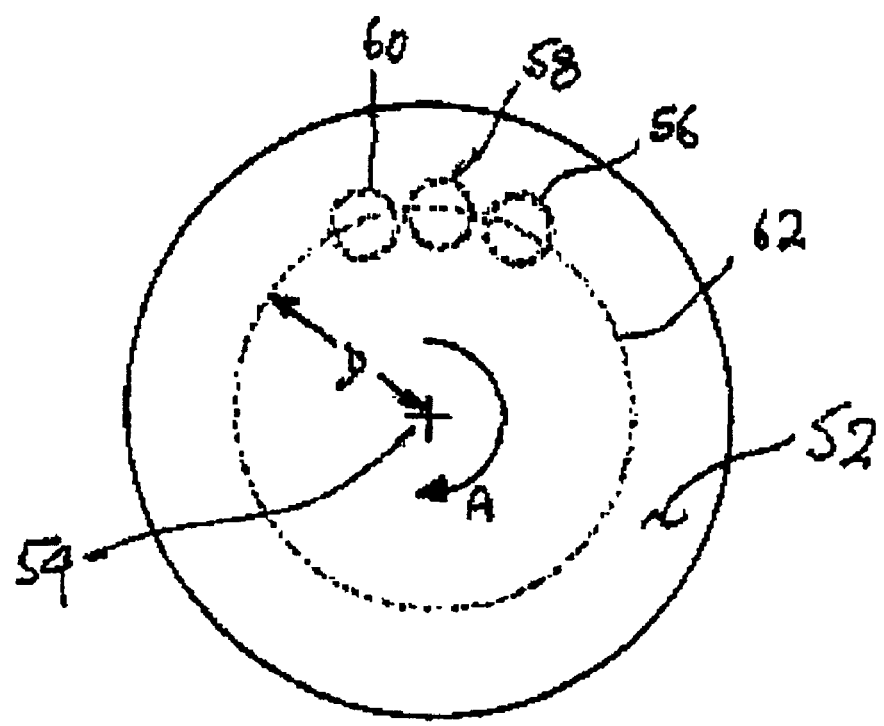
FIG. 2 schematically illustrates details of a window element of the rotatable window assembly of FIG. 1, including the spatial relationship of a rotation axis of the window element with areas on the window through which laser radiation passes.

Still referring to FIG. 1, and referring additionally to FIG. 2, rotatable window arrangement 50 includes a window element, or window pane, 52. UV radiation passing through the window pane is plane polarized. The window pane is inclined at Brewster's angle to the direction of the radiation. This minimizes reflection losses from the window without using antireflection coatings. The rotatable window arrangement includes a drive arrangement 51 and a bearing 53. The drive arrangement and the bearing provide that window element 52 can be rotated about an axis 54 normal to the window as indicated in FIGS. 1 and 2 by arrow A. The Brewster's angle of inclination is maintained as the window element his rotated. The drive arrangement and bearing are shown only in simplified form in FIG. 1 as inventive detail of the bearing cannot be shown effectively in scale of the drawing. Such detail is presented further hereinbelow.

Rotatable window arrangement 50 is arranged, co-operative with enclosure 24 and laser resonator 22 therein, such that UV radiation delivered from optically nonlinear crystal 48 is incident on, and passes through, window element 52 at an area 56 (see FIG. 2) thereon. Area 56 is radially displaced by a distance D from rotation axis 54. Should area 56 of window element 52 become degraded by the UV laser radiation, the window element may be rotated to place an undegraded area 58 in the path of a UV laser radiation. If area 58 becomes degraded window element 52 may be again rotated to bring an undegraded area 60 into the path of the UV laser radiation, and so on. The number of such rotations possible, of course, will depend on the beam diameter of the laser radiation and the circumference of an imaginary circle 62 on which the laser beam incidence areas a located.

Figure 3:
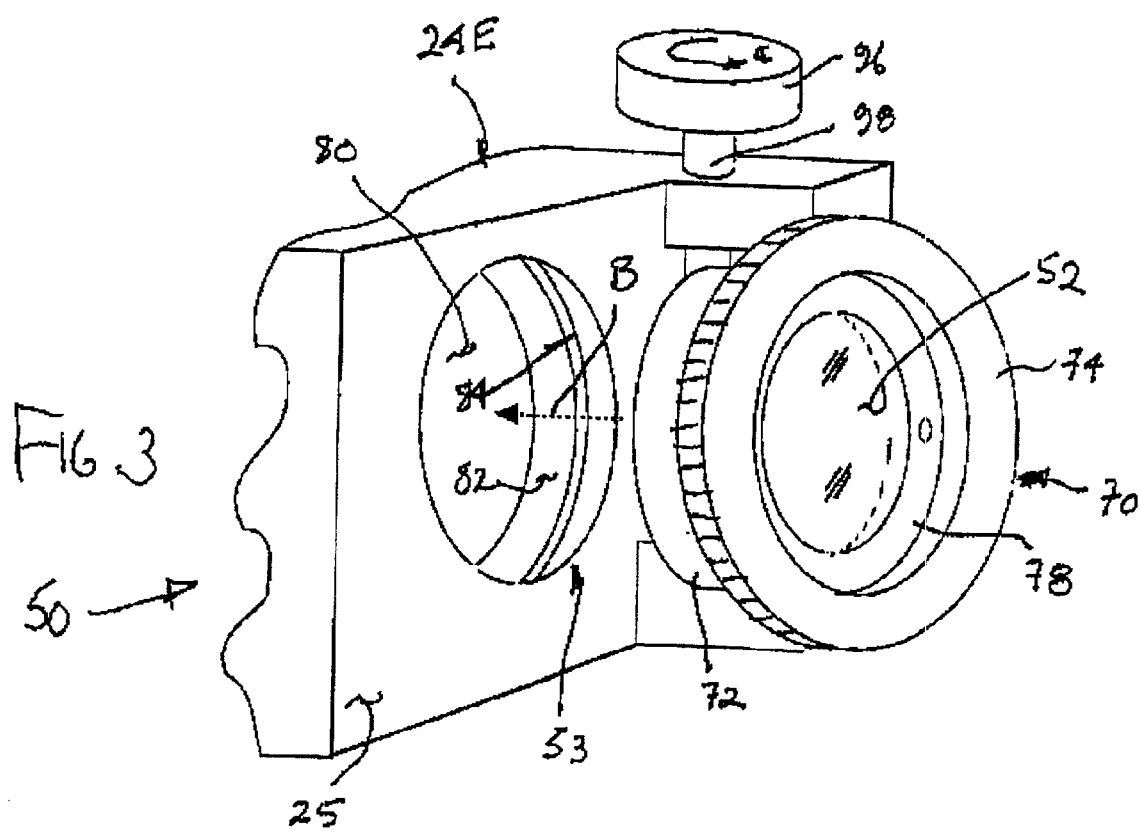
FIG. 3 is an exploded perspective view schematically illustrating one preferred embodiment of the rotatable laser window assembly of FIG. 1 including a circular aperture in a wall of the enclosure of FIG. 1 and a cylindrical mount for holding the window element of FIG. 2, the cylindrical amount arranged to rotatably fit in the circular aperture.
Figure 4:
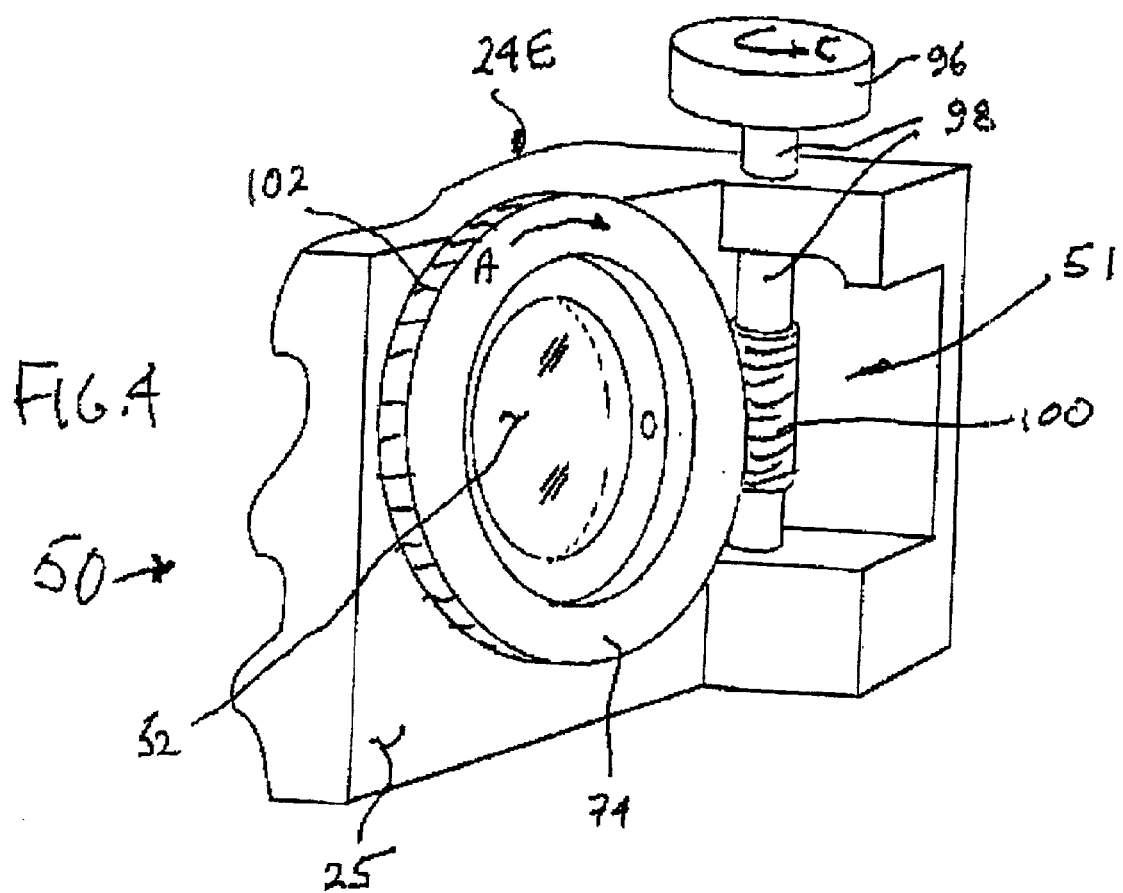
FIG. 4 schematically illustrates the rotatable laser window assembly of FIG. 3 with the cylindrical window mount inserted in the circular aperture, and further illustrates a worm-drive arrangement for rotating the cylindrical window mount in the circular aperture.
Figure 5:
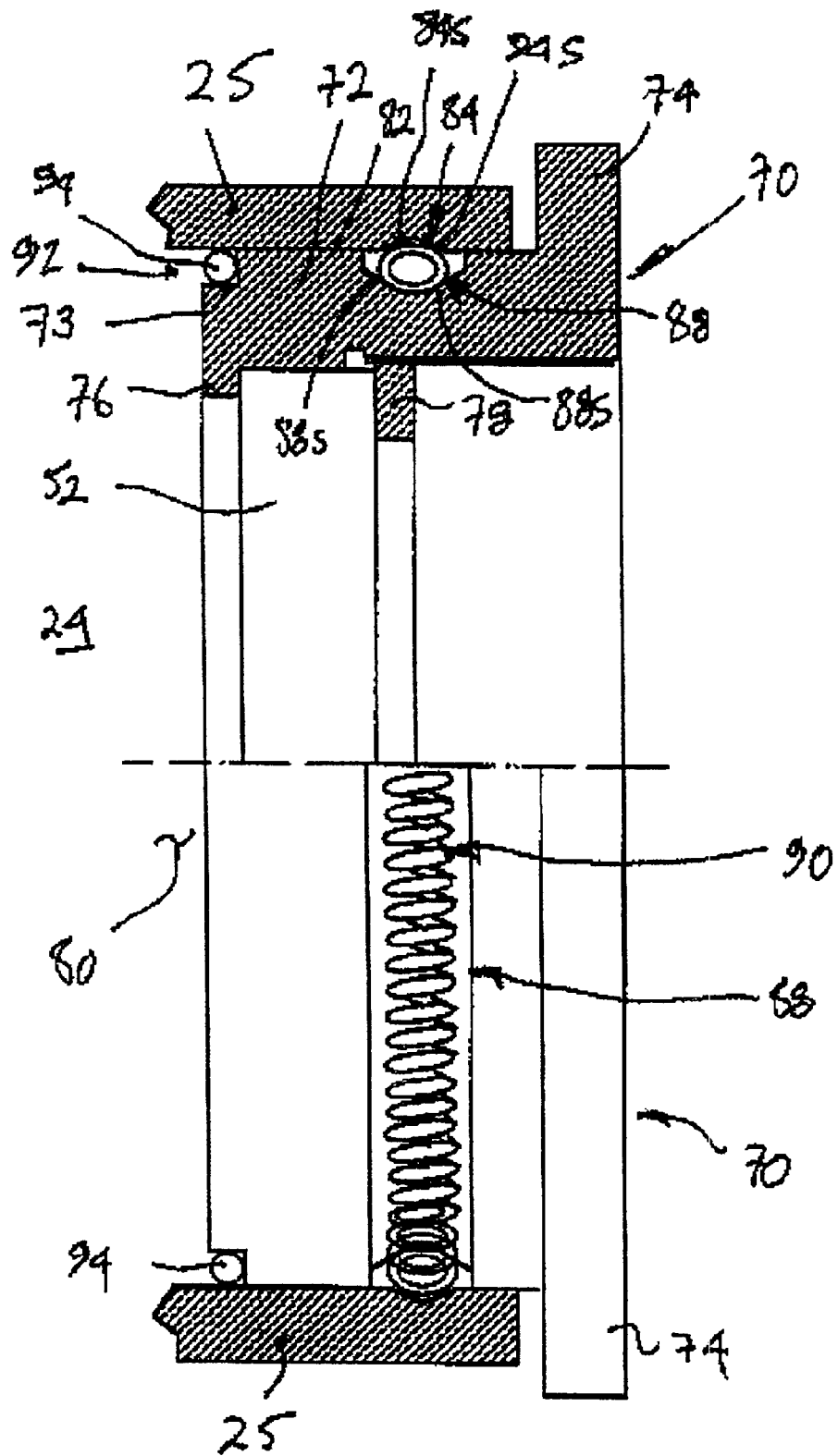
FIG. 5 is a view, partly in cross-section, schematically illustrates details of a bearing arrangement in the rotatable laser window of FIG. 3, wherein both the window mount and circular aperture are in cross-section in the upper half of the Figure, while only the circular aperture is in cross-section in the lower half of the Figure, with the Figure illustrating a circumferential groove in the cylindrical window mount and a mating groove in a wall of the circular aperture, and a coil spring in the form of a closed loop extending around the cylindrical window mount and being radially compressed in the mating grooves.

Referring now to FIGS. 3, 4 and 5, details of a preferred embodiment of rotatable window arrangement 50 are next described. Here, a cylindrical window mount 70 is configured to hold window element 52. Window mount 70 includes a cylindrical body portion 72 having and outwardly extending flange portion 74 on one end thereof, and an inwardly extending lip portion 76 on opposite end thereof (see FIG. 5). Window element 52 is held in window mount 70 by clamping the window element against lip portion 72 by means of a screw-in retaining ring 78.

A bearing 53 for window mount 70 includes a circular aperture 80 in wall 25 of extension 24E of enclosure 24. Aperture 80 may be referred to as a bearing sleeve, while cylindrical body portion 72 of window mount 70 may be referred to as a bearing shaft, here, of course, a short shaft. Rotation axis 54 of window 52 (see FIG. 2) corresponds to the rotation axis of the bearing shaft.

Those skilled in the art will recognize that while wall 25 is described here as an integral portion of enclosure 24 it could be a separate unit or plate attachable to the enclosure. Included in a circumferential wall 82 of aperture 80 is a truncated-V-shaped groove or channel 84 extending completely around the circumferential wall. Rotatable window arrangement 50 is assembled by inserting window mount 70 into aperture 80 as indicated in FIG. 3 by arrow B. Body portion 72 of window mount 70 is a running (rotatable) close-fit in aperture 80, as indicated in FIG. 5.

Extending completely around cylindrical body portion 72 of window mount 70 is a groove or channel 88 having a truncated V-shape. Groove 88 has a width greater than a width of groove 84. Before inserting window mount 70 into aperture 80, a coil spring 90, formed into a closed loop, is placed, under slight tension, in truncated-V-shaped groove 88. On inserting the window mount into the aperture, coil spring 90 is radially compressed, such that when the spring reaches groove 84 in wall 82 of aperture 80, the coil spring expands into groove 84 removably and rotatably retaining the window mount in the aperture. It should be noted here that while grooves 84 and 88 are exemplified here as having a truncated V-shape, the truncation of the V-shape is made primarily for mechanical convenience. For the purpose of this description and the appended claims, grooves 84 and 88 may be referred to generally as being simply "V-shaped".

Figure 6:
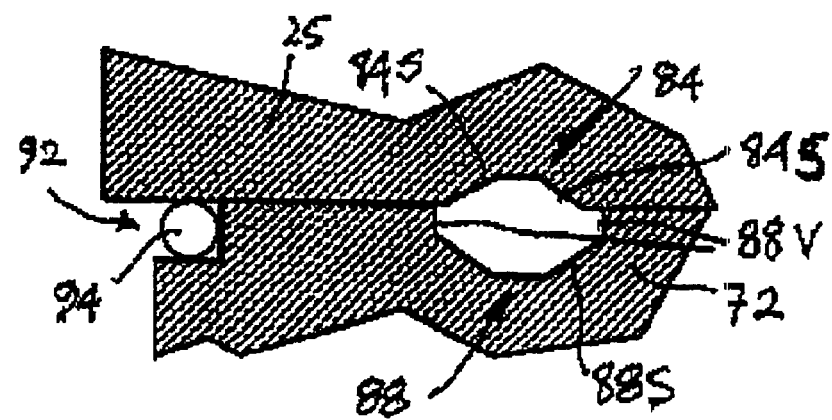
FIG. 6 is a cross-section view schematically illustrating details of the mating grooves in the cylindrical window mount and a circular aperture of FIG. 5.

Still referring to FIG. 5 and referring additionally to FIG. 6, the coil-diameter of coil spring 90 is selected, co-operative with the width and depth of groove 88 such that coils of the spring can be sufficiently compressed to allow window mount 70 to be inserted into aperture 80. The coil diameter is also preferably selected co-operative with the width and depth of grooves 84 and 88, such that when coils of coil spring 90, initially radially compressed in groove 88, expand into groove 84, coils of the coil spring remain under a lesser, but finite, radial compression. As such, the individual coils of the coil spring remain deformed into a slightly elliptical shape as indicated in FIG. 5. Each coil of the spring makes point contact with sloping walls 84S of groove 84, and 88S of groove 88. The effect of this is to preload window mount 70, axially and radially, in aperture 80.

The radial preload primarily serves to retain the window mount in the aperture. The axial preload serves primarily to retain the window in a predetermined alignment with the laser beam passing therethrough. As coil spring 90 makes only point contact with grooves 84 and 88, friction between the coil spring and the grooves is sufficiently small that the window mount can be rotated in the aperture by gentle hand pressure, without a need for a lubricant in the grooves or on coils of the spring. The radial and axial preload, however, are sufficient that this rotation can be accomplished while minimizing misalignment of the window and minimizing backlash.

In arriving at the rotatable window arrangement of the present invention, it was determined that coil spring 90 could not be substituted by a solid ring (an "O-ring") of a resilient compressible material such as an elastomer. It was found that in order to provide similar axial and radial preloads using such a ring, the ring would be deformed sufficient to cause the ring to make extensive surface-contact with grooves 84 and 88. This created sufficient friction that the window mount could not be easily rotated in the aperture. It was believed that this friction could lead to rapid failure of the ring.

In the application for which the inventive rotatable window arrangement is contemplated, it is important to minimize the use of lubricants. Vapor from such lubricants could enter enclosure 24 and cause contamination of optical elements of laser resonator 22, the optically nonlinear crystals, or window element 52 itself. Such contamination could initiate or accelerate optical damage to the optical components or the window.

Regarding hermetically sealing window mount 70 in aperture 80, it has been found that the running close-fit of body portion 72 of the window mount in aperture 80 significantly discourages ingress of contaminants into enclosure 24. It has been found preferable, however, to provide a separate sealing arrangement for minimizing the ingress of such contaminants. One such sealing arrangement 92 is illustrated in FIGS. 5 and 6. In sealing arrangement 92, body portion 72 of window mount 70 has a circumferential step 73 extending completely around the end thereof facing into enclosure 24. Extending completely around the circumferential step is a resilient, compressible sealing ring 94. In one preferred example, sealing ring 24 is made from a closed loop of spring-reinforced Teflon® tubing. The dimensions of sealing ring 94 and circumferential, stepped portion 73 are selected such that the sealing ring is under light compression when window mount 70 is inserted into aperture 80. The compression is selected to be sufficient to form a hermetic seal, but taken together with the inherently low friction coefficient of the Teflon® tubing, to be insufficient to adversely affect the ease of rotation of the window mount in the aperture afforded by the coil spring preloading of the present invention.

In one example of the inventive rotatable window assembly of FIGS. 3 through 6, window mount 70 and the material of wall 25 is aluminum. Body portion 72 of window mount 70 has an outside diameter of 2.100 inches. Aperture 80 has a diameter of 2.125 inches. Groove 88 in body portion 72 of window mount 70 has a width of 0.106 inches and a diameter at its base of 1.994 inches, i.e., a depth of 0.131 inches. Vertical walls 88V (see FIG. 6) have a height of 0.56 inches. Sloping walls 88S are inclined at 30 degrees to the longitudinal axis of window mount 70. Groove 84 in bearing wall 82 has and depth of 0.018 inches and a width of 0.087 inches. Sloping walls 84S are inclined at 30 degrees to the longitudinal axis of window mount 70. The sloping walls of both grooves are finished to a 63 microfinish.

Figure 7:
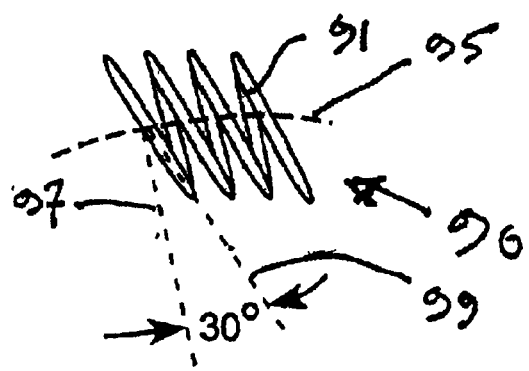
FIG. 7 is a fragmentary elevation view schematically illustrating a preferred arrangement of coils in the coil spring of FIG. 5 wherein the coils are canted at 30 degrees to the longitudinal axis of the spring.

Coil spring 90 is made from stainless-steel wire having a diameter of 0.011 inches (0.26 mm). The spring is in the form of a continuous loop having an inside diameter of 1.920 inches. The coil diameter of spring 90 is 0.083 inches. As illustrated in FIG. 7, coils 91 of the spring are preferably canted at an angle of about 30 degrees to the longitudinal axis 95 of the coil spring, which, of course, is circular when the spring is in the form of a loop. In FIG. 7 dotted line 97 is a normal to the curve of longitudinal axis 94 and dotted line 99 indicated the inclination of a coil to the longitudinal axis. This canting of the coils of coil spring 90 provides that the coil spring has an outside diameter of 2.003 inches. A spring such as coil spring 90 is available from Bal Seal Engineering Company Inc., of Foothill Ranch, Calif.

Canting of the coils allows the coils to be easily compressed to allow window unit 70 to be inserted in aperture 80. A disadvantage of the canting, however, is that the window unit has a preferred direction of rotation. Rotation of the window unit is easiest in a direction that tends to further cant the coils. Rotation in the opposite direction, if desired can be facilitated by application to the spring of vacuum diffusion pump oil. Such oil has a very low vapor pressure at room temperature and does not cause noticeable contamination of enclosure 24.

The dimensions given above for coil spring 90 on those dimensions that the spring has when it is not located around groove 88 of window mount 70. When coil spring 90 is located around groove 88, the length (circumference) of the spring is extended by between about 3% and 4%. This extension provides longitudinal tension in the spring for retaining the spring in groove 88.

Referring again to FIGS. 3 and 4, in one preferred embodiment of a drive arrangement 51, a manual drive knob 96 is connected via a shaft 98 to a worm gear 100. Worm gear 100 engages gear teeth 102 disposed around the edge of flange portion 74 of window mount 70. Window mount 70 can be rotated in aperture 80 by rotating knob 96 in the direction indicated by arrow C.

The present invention is described above in terms of a preferred and other embodiments. The invention, however, is not limited to the embodiments described and depicted herein. Rather, the invention is limited only by the claims appended hereto.

What is claimed is:

1. A bearing apparatus, comprising:
   a cylindrical bearing sleeve including an inner wall having a first circumferential groove extending therearound;
   a bearing shaft rotatably located within said bearing sleeve and having a second circumferential groove extending therearound, said second groove aligned with said first groove; and
   a coil spring in the form of a continuous loop located within said first and second grooves and arranged to rotatably and removably retain said bearing shaft in said bearing sleeve.

2. The bearing apparatus of claim 1, wherein said coil spring is held under longitudinal tension in said second groove.

3. The bearing apparatus of claim 1, wherein coils of said coil spring are radially compressed between said first and second grooves.

4. The bearing apparatus of claim 1, wherein coils of said coil spring are canted at an angle of about 30 degrees to the longitudinal axis of said coil spring.

5. The bearing apparatus of claim 1, wherein said first and second grooves are generally V-shaped and each thereof includes first and second sloping surfaces, and wherein said first and second grooves and said coil spring are configured such that coils of said coil spring make point contact with said first and second sloping surfaces of said first and second grooves.

6. The bearing apparatus of claim 1, wherein at least one of said first and second grooves has a truncated V-shape.

7. Apparatus for rotating a window in an enclosure, comprising:
   a cylindrical bearing sleeve located in a wall of the enclosure, said bearing sleeve including an inner wall having a first circumferential groove extending therearound;
   a bearing shaft rotatably located within said bearing sleeve and having a second circumferential groove extending therearound, said second groove aligned with said first groove;
   a coil spring in the form of a continuous loop located within said first and second grooves and arranged to rotatably and removably retain said bearing shaft in said bearing sleeve; and
   said bearing shaft being in the form of an open cylinder and arranged to hold the window therewithin.

8. The apparatus of claim 7, wherein said first and second grooves are generally V-shaped and each thereof includes first and second sloping surfaces, and wherein said first and second grooves and coil spring are configured such that coils of said coil spring make point contact with said first and second sloping surfaces of said first and second grooves.

9. The apparatus of claim 7, further including an arrangement for rotating said bearing shaft within said bearing sleeve.

10. The apparatus of claim 9, wherein said rotating arrangement includes an annular flange on one end of said bearing shaft, said flange having gear teeth around the periphery thereof, and a drive shaft having a worm gear thereon engaging said teeth of said flange such that said bearing shaft can be rotated by rotating said drive shaft.

11. The bearing apparatus of claim 7, wherein said coil spring is held under tension in said second groove.

12. The bearing apparatus of claim 7, wherein coils of said coil spring are radially compressed between said first and second grooves.

13. Apparatus for rotating a window in a laser enclosure, the laser enclosure including a laser resonator arranged to deliver an output beam from the enclosure via the window, the apparatus comprising:
   a bearing member on the enclosure the bearing member having a circular aperture extending therethrough into the enclosure, and said circular aperture having a circumferential wall, said circumferential wall having a first groove extending completely therearound;
   a window holding member, said holding member having a cylindrical body portion arranged to rotatably fit in said circular aperture in said bearing member, and said cylindrical body portion including arrangement for holding the window therein;
   said bearing member and said window holding member being configured such that when said cylindrical body portion of said window holding member is fitted in said circular aperture in said bearing member a longitudinal rotation axis of the window is defined and said window may be rotated about said rotation axis by rotating said cylindrical body portion of said window holding member;
   said bearing member and said window holding member been further configured such that when said cylindrical body portion of said window holding member is fitted in said circular aperture the output beam is transmitted through the window at a first region thereon offset from said rotation axis by a predetermined distance, said predetermined distance selected such that said window holding member may be rotated such that the output beam is transmitted therethrough at a second region thereon angularly displaced from said first region; and
   said cylindrical body portion of said window holding member having a second groove extending completely therearound, a coil spring in the form of a continuous loop being located, under tension, in said second groove, said coil spring been configured such that when said cylindrical body portion of said holding member is fitted in said circular aperture said coil spring also extends around said first groove in contact therewith, said first and second grooves and said coil spring being configured such that said window holding member is removably and rotatably retained in said bearing member.

14. The apparatus of claim 13, further including an arrangement for rotating said window holding member.

15. The apparatus of claim 14, wherein said rotating arrangement includes an annular flange on one end of said cylindrical body portion of said cylindrical holding member, said flange having gear teeth around the periphery thereof, and a drive shaft having a worm gear thereon engaging said teeth of said flange such that said window holding member can be rotated by rotating said drive shaft.

16. The apparatus of claim 13, wherein said first and second grooves are generally V-shaped and each thereof includes first and second sloping surfaces, and wherein the first and second grooves and coil spring are configured such that coils of said coil spring make point contact with said first and second sloping surfaces of said first and second grooves.

17. Laser apparatus, comprising:
   a laser located in an enclosure;
   a cylindrical bearing sleeve located in a wall of said enclosure, said bearing sleeve including an inner wall having a first circumferential groove extending therearound, said first groove being generally V-shaped and including first and second sloping surfaces;
   a bearing shaft rotatably located within said bearing sleeve and having a second circumferential groove extending therearound, said second groove being generally V-shaped and including first and second sloping surfaces, and said second groove being aligned with said first groove;
   said bearing shaft being in the form of an open cylinder having a window held therewithin, said window having a rotation axis corresponding to the rotation axis of said bearing shaft;
   a coil spring in the form of a continuous loop located within said first and second grooves with coils of said coil spring in point contact with said first and second sloping surfaces of said first and second grooves, thereby rotatably and removably retaining said bearing shaft in said bearing sleeve; and
   said laser providing a laser beam and arranged in said enclosure such that said laser beam is transmitted through said window at a point at a first region thereon offset from said rotation axis thereof by a predetermined distance, said predetermined distance selected such that said bearing shaft may be selectively rotated to cause said laser beam to be transmitted through said window at a second region thereon displaced from said first region.

\* \* \* \* \*